United States Patent [19]
Takano et al.

[11] Patent Number: 5,523,999
[45] Date of Patent: Jun. 4, 1996

[54] PACKET DATA SWITCHING SYSTEM

[75] Inventors: Ryouzi Takano; Masataka Sakai; Sumie Morita; Kiyohumi Mitsuze; Yoshiharu Kato, all of Kawasaki, Japan

[73] Assignee: Fujitsu Limited, Kanagawa, Japan

[21] Appl. No.: 407,801

[22] Filed: Mar. 20, 1995

Related U.S. Application Data

[63] Continuation of Ser. No. 978,914, Nov. 19, 1992, abandoned.

[30] Foreign Application Priority Data

Nov. 19, 1991 [JP] Japan ..................... 3-302866

[51] Int. Cl.⁶ ........................................ H04J 3/02
[52] U.S. Cl. ............................... 370/58.2; 370/60
[58] Field of Search .................. 370/60, 60.1, 61, 370/58.1, 58.2, 58.3, 59, 94.1, 53, 55, 68.1; 340/825.03, 825.04

[56] References Cited

U.S. PATENT DOCUMENTS 5,101,404 3/1992 Kunimoto et al. ................ 370/60
5,136,584 8/1992 Hedlund .......................... 370/94.1
5,160,583 8/1992 May et al. ........................ 370/60

FOREIGN PATENT DOCUMENTS 1137749 5/1989 Japan .

OTHER PUBLICATIONS

Jim Lane, Telco System, Inc, "Asynchronous Transfer Mode : Bandwidth for the Future", p. 2, 1992.

*Primary Examiner*—Melvin Marcelo
*Assistant Examiner*—Huy D. Vu

[57] ABSTRACT

A packet data switching system having packet switching equipment and a plurality of transfer control units cooperating with the packet switching equipment exchanging packet data to be transferred through the transfer control units. In the system each packet data is divided into packet frames each having the same frame length and all the packet frames are processed synchronously in each of the transfer control units. Each of the packet frames is composed of a header area and data area. The header area is used for indicating transfer control information, such as an address of a destination transfer control unit and a continuous transmission flag which denotes that the related packet frame should be exchanged to the same destination as that of the preceding packet frame.

12 Claims, 9 Drawing Sheets

PACKET DATA SWITCHING SYSTEM

This is a continuation of application Ser. No. 07/978,914, filed Nov. 19, 1992, now abandoned.

BACKGROUND OF THE INVENTION

1. Field of the Invention

The present invention relates to a packet data switching system.

2. Description of the Related Art

The conventional packet data switching system is typically comprised of a plurality of transfer control units that send and receive packets to be transferred between packet terminals, a call processing unit and a packet handling unit. All the above units are interconnected via a standard bus, a common bus or the like.

The conventional packet data switching system is however not suitable for coping with a heavy load of packet calls. To solve the above problem, a multiprocessor system such that each processor is connected to a data ring bus has been proposed, and thereby a large amount of data traffic can be dealt with.

As will be clarified hereinafter, the packet data switching system having the data ring bus is mainly comprised of a plurality of transfer control units that send and receive packet data to be transferred between packet terminals, a packet call processing unit and a data ring bus, to which the above transfer control units and packet call processing unit are connected.

In the above packet data switching system, along with a further increase in the data traffic between the packet terminals, a heavy load is applied to the packet call processing unit as well as the data ring bus. To cope with the above hereby load, preparation of a large capacity packet call processing unit and a large capacity data ring bus are required. For example, the packet call processing unit should be realized by a extremely high speed processor in the form of a multiprocessor. Further, employment of optical communication for the data ring bus is required. This apparently is not advantageous in constructing an economical packet data switching system.

SUMMARY OF THE INVENTION

Therefore, the present invention, in view of the above problem, has as its object the provision of a high capability packet data switching system which can be realized economically.

To attain the above object, the packet data switching system of the present invention introduces therein packet switching equipment in place of the conventional data ring bus, wherein each packet data is divided into packet frames each having the same frame length. Each packet frame is composed of a header area carrying transfer control information and a data area carrying inherent packet data. The packet frames are inputted synchronously into the packet switching equipment for respective exchanges, the packet switching equipment being comprised of a plurality of sets of dropper means for dropping the transfer control information from each packet frame; a plurality of sets of selector means for receiving each packet frame from respective dropper means for selecting one of the packet frames if a destination defined by the thus dropped transfer control information coincides with the related selector means, and plurality of sets of inserter means for receiving each packet frame does not include the transfer control information from the corresponding selector means, and inserting other transfer control information to be sent to the destination transfer control unit.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein will be first described with reference to the related figures.

Figure 1:
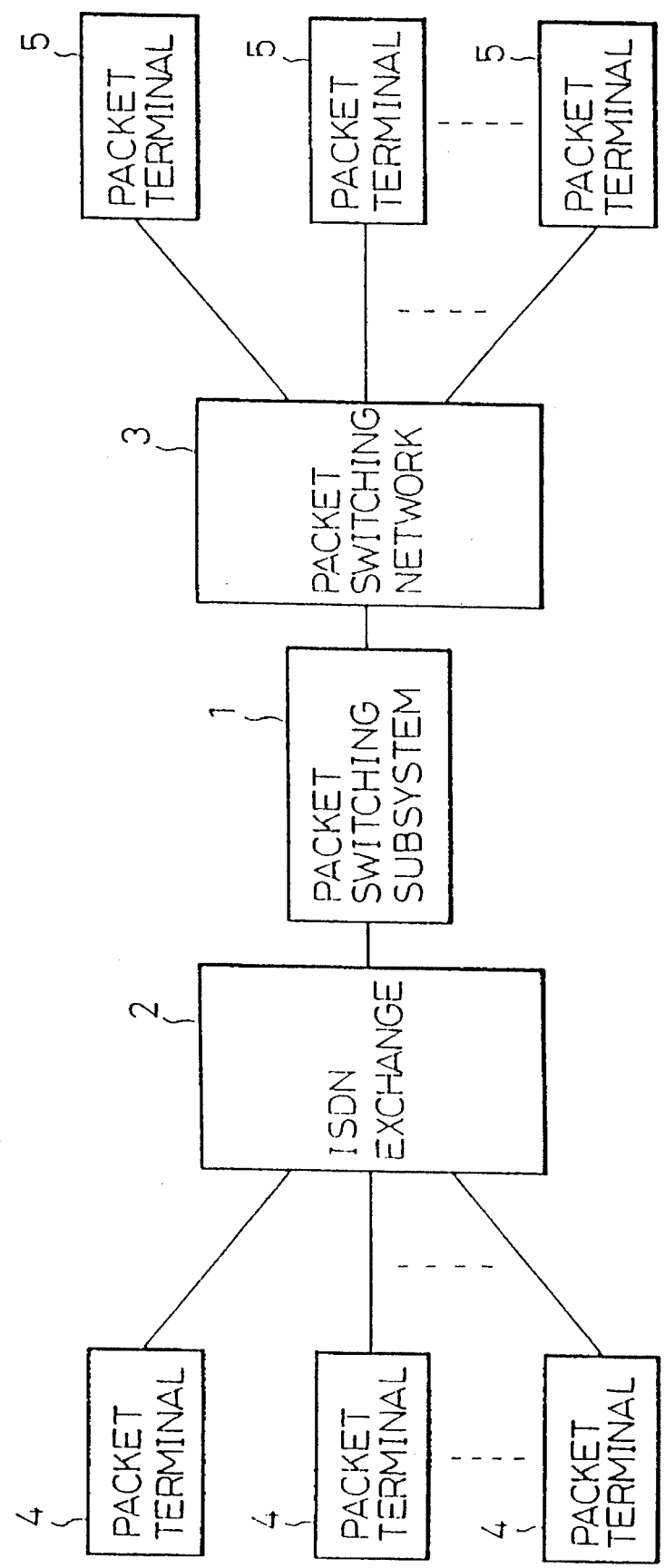
FIG. 1 is a block diagram representing a known communication network to which the present invention can be adopted.

FIG. 1 is a block diagram representing a known communication network to which the present invention can be adopted. In the example of the communication network shown in FIG. 1, the present invention is preferably applied to a packet switching subsystem 1. The subsystem 1 achieves a transfer of packet data to be communicated between packet terminals 4 accommodated in an ISDN exchange 2 as well as a transfer of packet data to be communicated between the packet terminal 4 and a packet terminal 5 accommodated in a packet switching network 3.

The packet switching subsystem 1 is usually coupled with the ISDN exchange and cooperates therewith, and also works as an interface for the packet switching network 3. In summary, the packet switching subsystem 1 handles packet processing needed for the transfer of packets between the packet terminals 4 and between the packet terminals 4 and 5.

Figure 2:
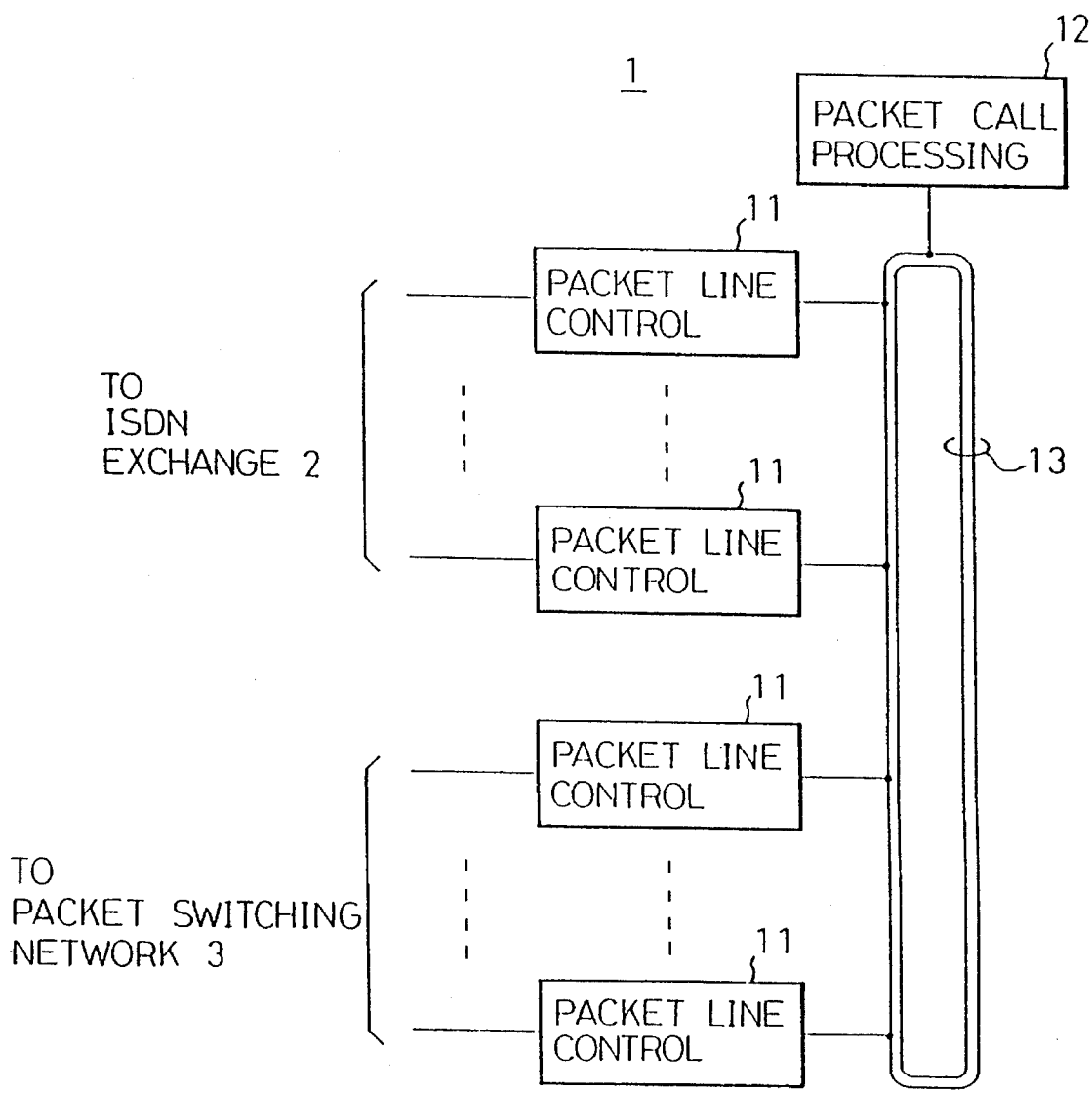
FIG. 2 illustrates the packet switching subsystem of FIG. 1 in more detail.

FIG. 2 illustrates the packet switching subsystem of FIG. 1 in more detail. As seen from FIG. 2, the conventional packet switching subsystem 1 is comprised of a plurality of packet line control units, i.e., a transfer control unit for each link, a packet call processing unit 12 and a data ring bus 13.

Each packet line control unit 11 operates to decompose each packet from the ISDN exchange 2 as well as the packet switching network 3 so that packet data are obtained. The thus obtained packet data is first transferred to the packet call processing unit 12 via the data ring bus 13 to determine a destination unit 11 thereby. The packet data is then transferred, via the bus 13, to the thus determined destination unit in which the thus transferred data packet is composed to again become the packet. Thereafter the packets are sent to the ISDN exchange 2 and to the packet switching network 3.

To be more specific, each of the packet line control units works merely as a link controller. That is, each unit 11 performs a termination for the so-called layer 2, and therefore, each unit 11 does not apply any processing to the packet data per se. In the layer 2, a retransmission of packet data is carried out when a link fault occurs, as an example.

As mentioned above, in the conventional packet switching subsystem 1, every packet data sent to each of the packet line control units is first applied, via the data ring bus 13, to the packet call processing unit 12 without exception so as to determine the destination unit 11 according to address information in each packet data. Accordingly, when the packet data traffic increases between the packet terminals 4 and between the packet terminals 4 and 5, the load applied to the packet call processing unit 12 as well as to the data ring bus 13, necessarily becomes extremely heavy. This causes the problem mentioned before.

Figure 3:
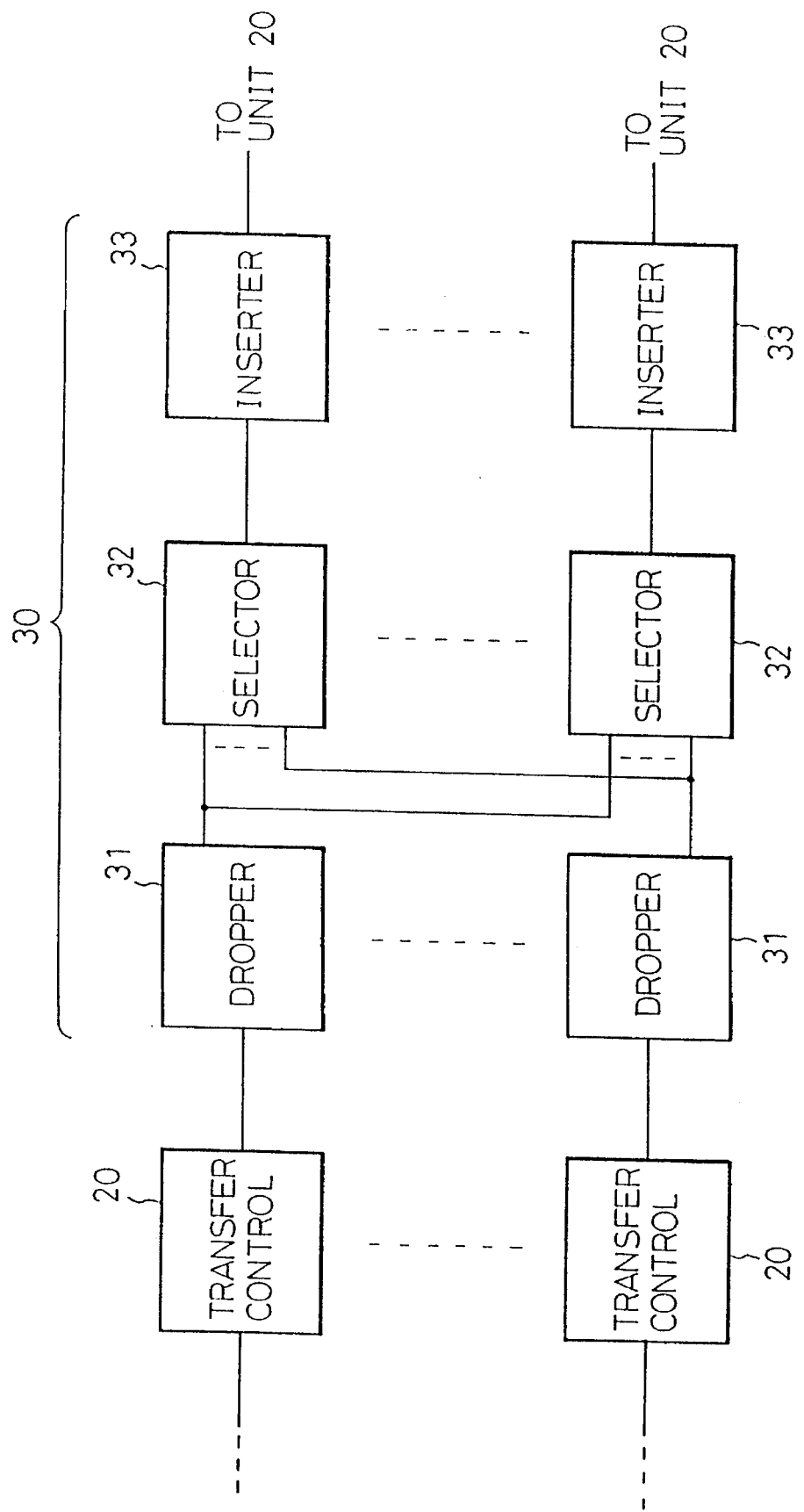
FIG. 3 is a general block diagram of a packet data switching system according to the present invention.

FIG. 3 is a general block diagram of a packet data switching system according to the present invention. In FIG. 3, reference numeral 20 represents a transfer control unit which corresponds to the aforesaid packet line control units 11 and the packet call processing unit 12. The remaining blocks 31, 32 and 33 are newly introduced by the present invention, and are located, in FIG. 2, at the portion where the data ring bus 13 exists. Thus, in the present invention, no such data ring bus 13 is used.

In FIG. 3, reference numeral 31 denotes a dropper means, 32 a selector means and 33 an inserter means.

Generally, the packet data switching system of the present invention is comprised of a plurality of transfer control units 20 each sending and receiving packet data, and packet switching equipment 30 (FIG. 3) for exchanging each packet data output from one of the transfer control units 20 to another of the transfer control units 20 according to address information written in the corresponding packet. Each transfer control unit 20 receives each packet data to be exchanged and produces a plurality of packet frames by dividing the thus received packet data with the same frame length. The transfer control unit 20 further adds transfer control information to each packet frame. All of the transfer control units 20 operate synchronously in communicating respective packet frames to and from the packet switching equipment 30.

The packet switching equipment 30 is comprised of dropper means 31 for dropping the transfer control information from each packet frame from respective transfer control units 20, selector means 32 for receiving the packet frames from the transfer control units 20 and selecting one of the packet frames if a destination defined by the thus dropped transfer control information coincides with the related selector means, and inserter means for receiving the packet frames having no transfer control information from the selector means 32 and inserting other transfer control information to be sent to the destination transfer control unit 20.

In this case, the transfer control unit 20 generates a continuous transmission flag as the transfer control information if series of the packet frames are to be sent serially to the same destination transfer control unit 20.

Figure 4:
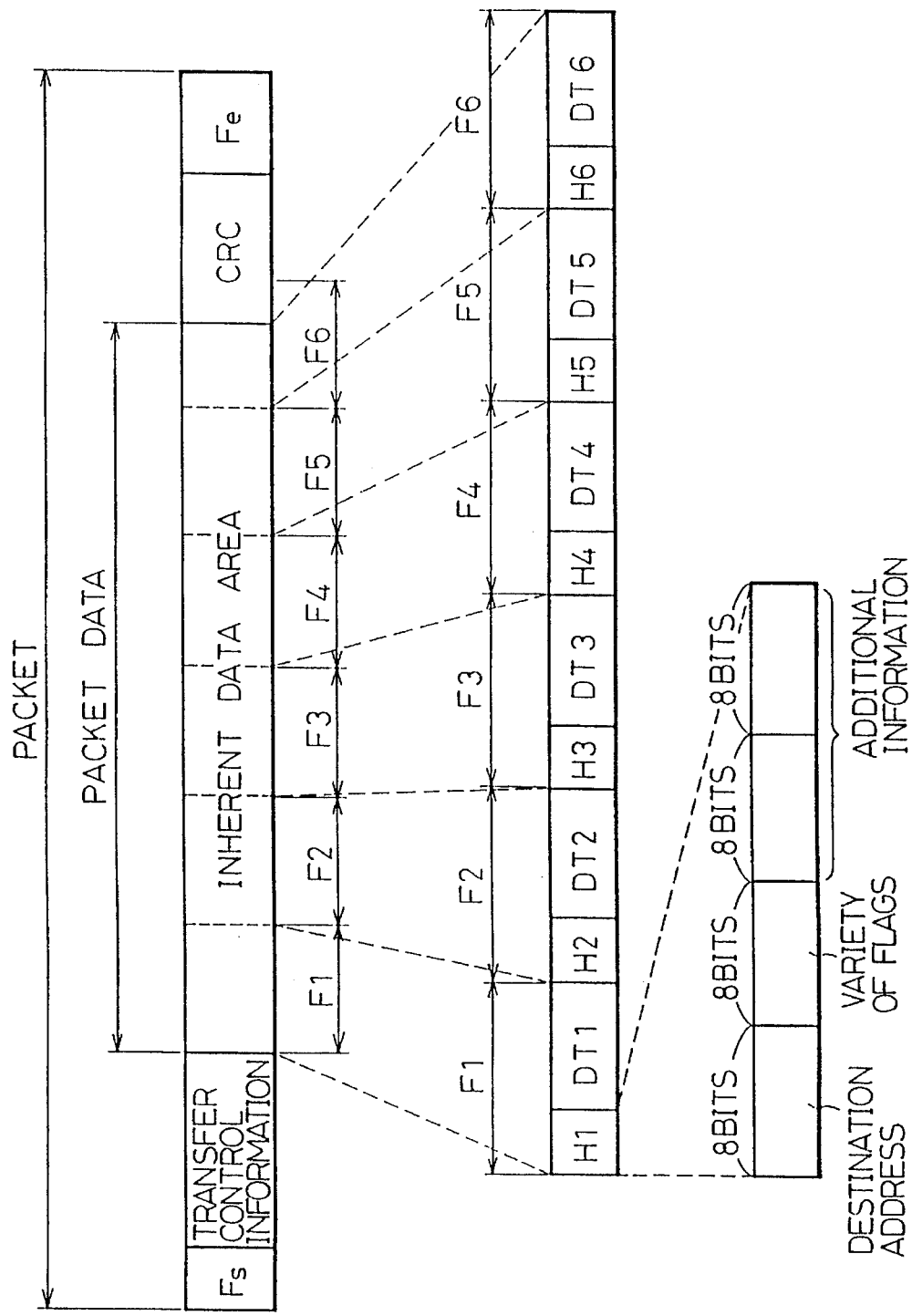
FIG. 4 is schematic view showing a data format structure.

FIG. 4 is a schematic view showing a data format structure. In FIG. 4, a usual packet represented as "PACKET" is shown in upper row. The usual packet is composed of, as known, a start flag Fs, transfer control information (address information), packet data (inherent data area carrying, e.g., computer data), a cyclic redundancy check (CRC) area and an end flag Fe.

According to the present invention, the packet data is divided into a plurality of packet frames (F), e.g., six packet frames F1 through F6 each having the same frame length, as shown in middle row of FIG. 4. The number of the packet frames (F) is dependent on the length of the packet data. All the packet frames (F) are uniformly composed of both header areas (H1 to H6) and data areas (DT1 to DT6), and the header area is allotted to carry the transfer control information.

The header area (H) is represented, as an example, in the lower row of FIG. 4. The aforesaid continuous transmission flags are written in the same areas in respective packet frames F2 to F6 as the area "VARIETY OF FLAGS". The last packet frame F6 is not fully used and thus the remaining data area is not effective. In this case, the additional information area of the lower row in FIG. 4 can be used to indicate an effective data length.

Only the head packet frame F1 in the series of the packet frames F1 to F6 is indicative of the destination address information in its header area H1 to discriminate the head of the packet frame series F1 to F6.

The above mentioned uniform division of the packet data into identical packet frames contributes to realization of a simple switching operation in the packet switching equipment 30, which makes it possible to fabricate the packet data switching system at a low price.

Figure 5:
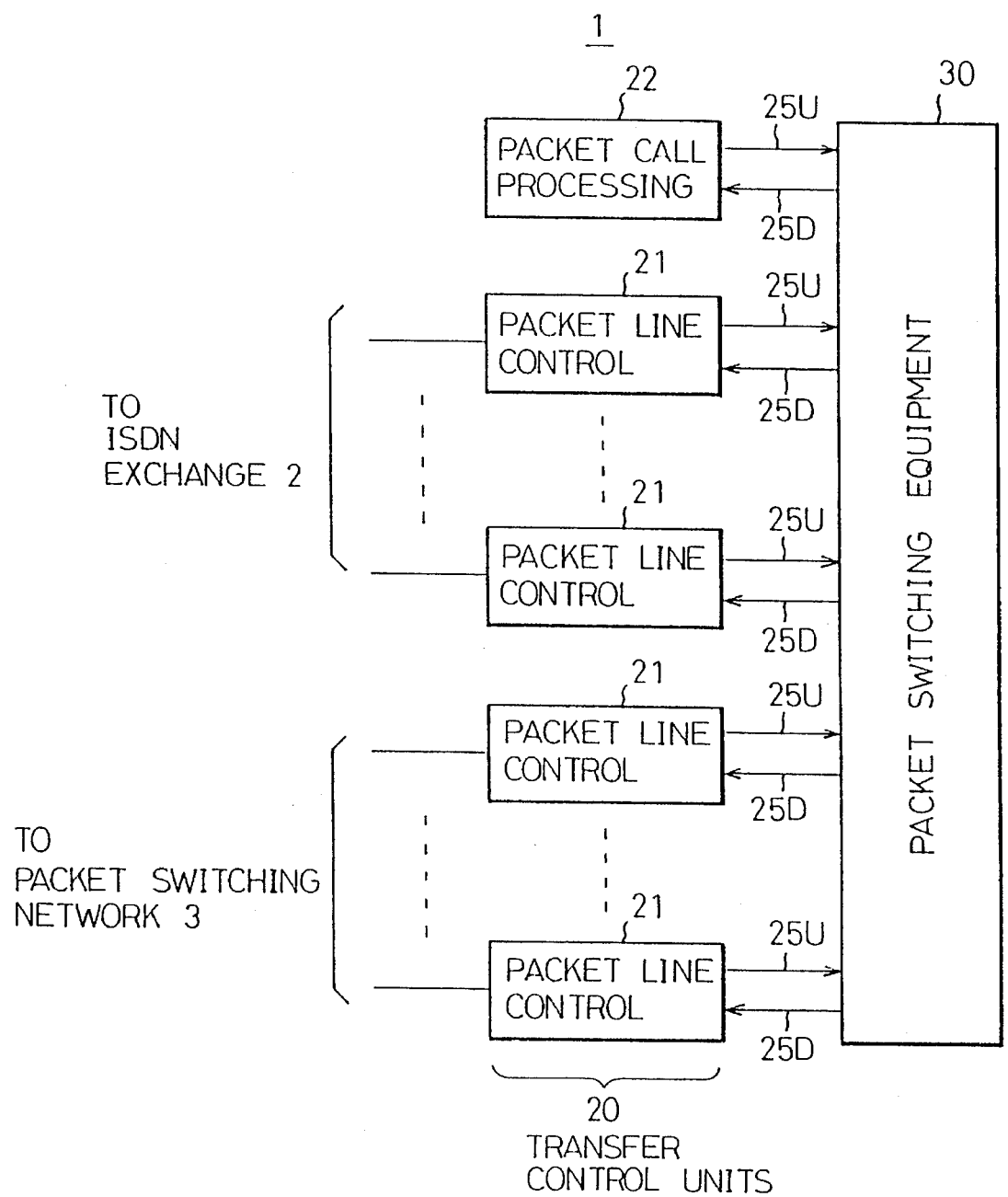
FIG. 5 shows a packet data switching system set up in, for example, a packet switching subsystem.

FIG. 5 shows a packet data switching system set up in, for example, a packet switching subsystem. The packet switching subsystem 1 has already been explained in FIG. 1 and FIG. 2. The construction of FIG. 5 corresponds to the construction of FIG. 2. The members represented by reference numerals 21 and 22, i.e., the transfer control units 20, of FIG. 5 are equivalent to the packet line control units 11 and the packet call processing unit 12 respectively. Each of the units 11 and 12 is coupled to the packet switching equipment 30 via respective upstream highways 25U and downstream highways 25D.

Namely, according to an embodiment of the present invention, the system is constructed in the packet switching subsystem 1 located between the packet switching network 3 and the ISDN exchange 2, in which the transfer control units 20 are comprised of packet line control units 21 and the packet call processing unit 22 which are inherently accommodated in the packet switching subsystem, and these packet line control units 21 and packet call processing unit 22 cooperate, via respective upstream highways 25U and downstream highways 25D, with the packet switching equipment 30 for exchanging the packet data to be communicated between each two transfer control units 20.

Figure 6:
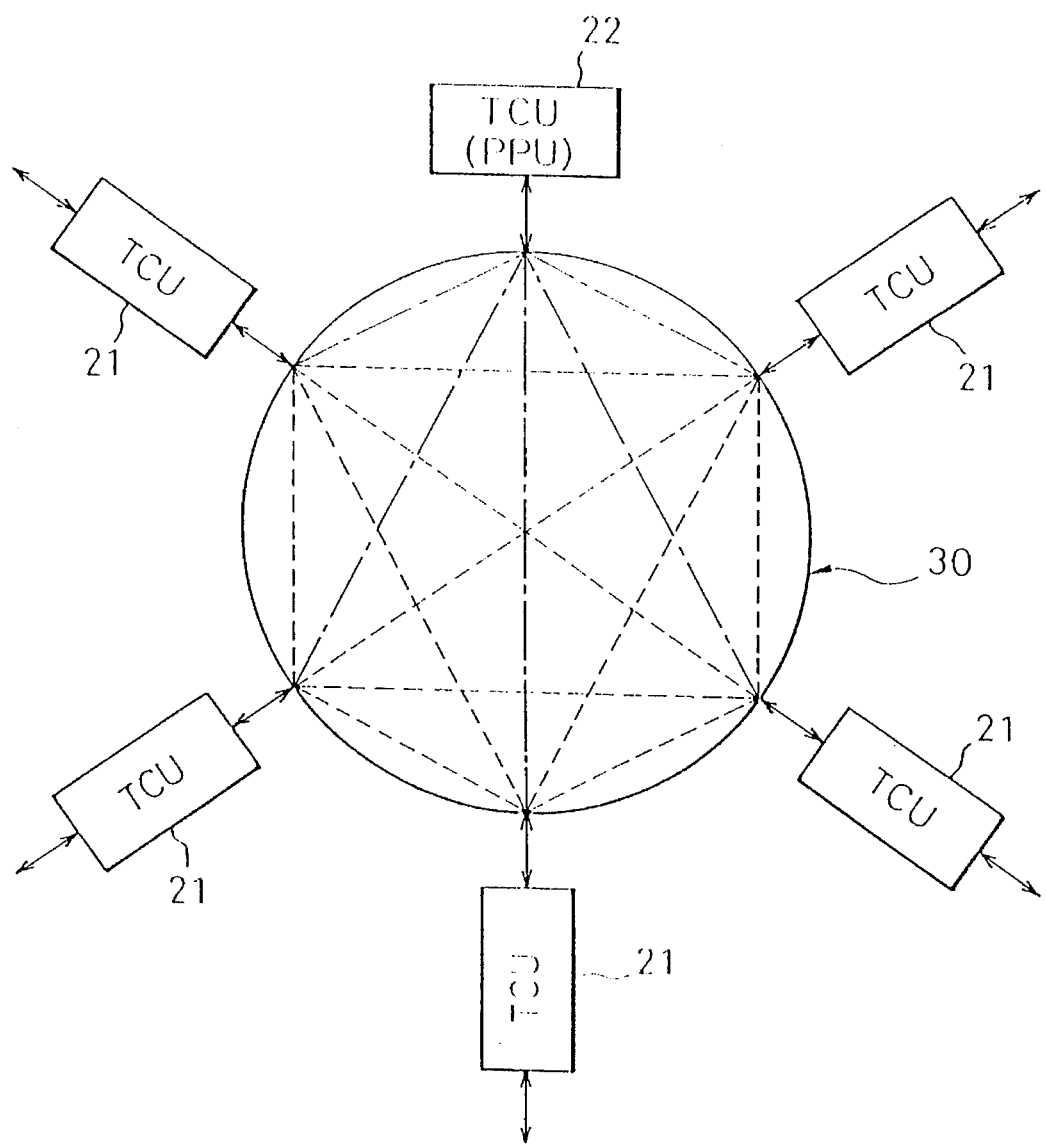
FIG. 6 is an explanatory view of the packet switching equipment 30 shown in FIG. 5.

FIG. 6 is an explanatory view of the packet switching equipment 30 shown in FIG. 5. In FIG. 6, the packet call processing unit (PPU) receives, via respective chain dotted lines, the first header area H1 of the packet frame series input to the packet switching equipment 30 and analyzes the packet transfer path to be connected to the destination transfer control unit (TCU) 21 via respective broken lines.

In this case, all the sets of the transfer control information in each packet frame (F) are generated in the transfer control units 20 and applied to the packet switching equipment 30 synchronously at the same timing.

Figure 7:
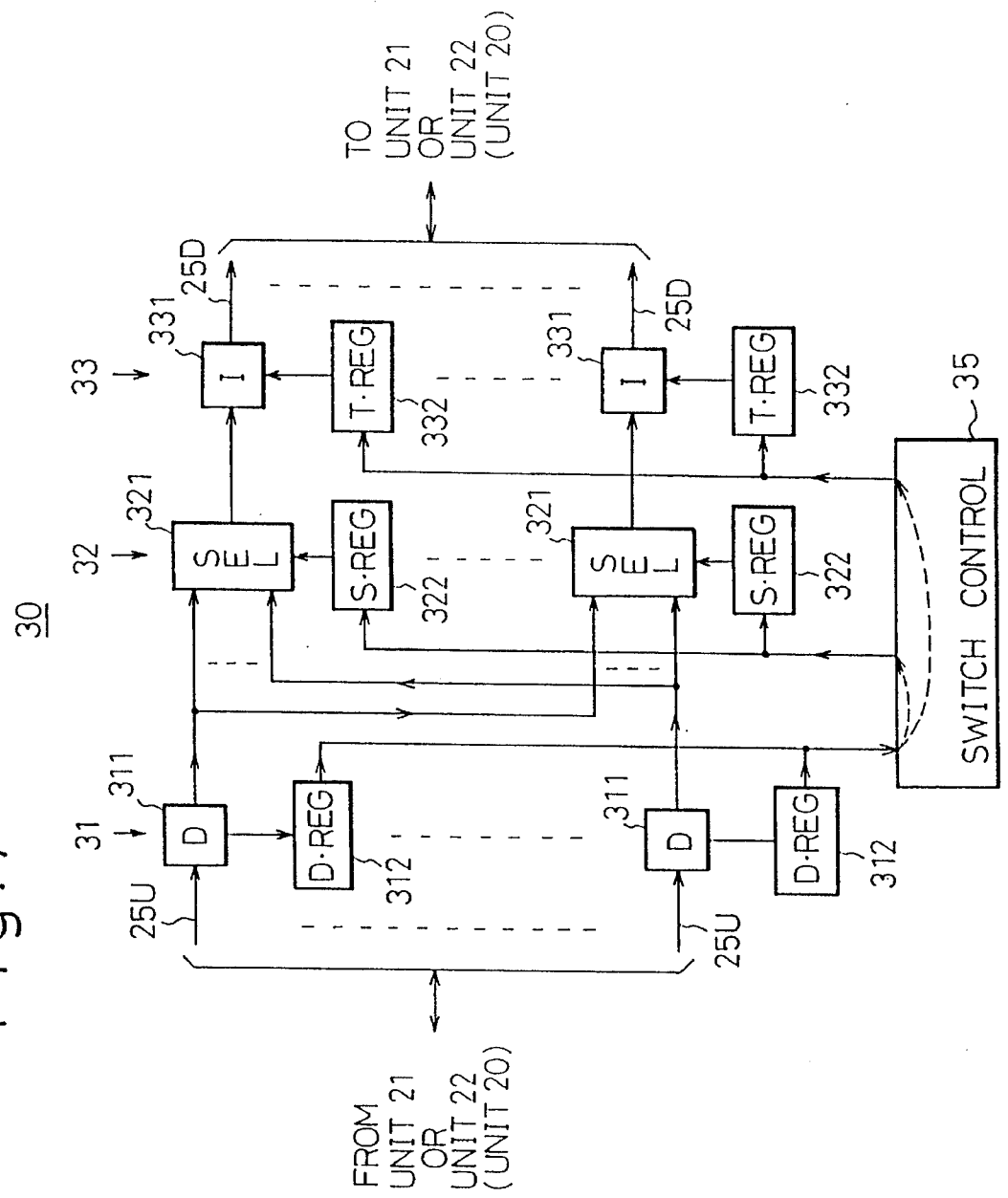
FIG. 7 illustrates a detailed example of the packet switching equipment 30 shown in FIGS. 1 and 5.

FIG. 7 illustrates a detailed example of the packet switching equipment 30 shown in FIGS. 1 and 5.

In FIG. 7, each dropper means 31 is comprised of droppers (D) 311 through which the packet data from respective upstream highways 25U pass sequentially and dropped information registers (D·REG) 312 which momentarily store therein each transfer control information dropped from the above dropper 312.

Each selector means 32 is comprised of selectors (SEL) 321 which receive the packet frames from the droppers 311 which have no respective transfer control information, and selection information registers (S·REG) 322 which are supplied with selection information for determining respective destination packet line control units 20 according to the thus dropped transfer control information and specifies the corresponding one of the input packet frames to be passed through the selector 321.

Each inserter means 33 is comprised of inserters (I) 331 and termination information registers (T·REG) 332, each of the termination information registers 332 is supplied with other transfer control information to be used by the destination packet line control unit 21, this information being derived from the corresponding dropped transfer control information and the thus registered termination information in T·REG 332 is inserted, as the transfer control information, into the packet frames (F) from the corresponding selector 321 and sent to respective downstream highways 25D.

In FIG. 7, a switch control unit 35 is mounted in the packet switching equipment 30. The switch control unit 35 receives each transfer control information from the dropped information register (D·REG) 312 and analyzes the same to produce both the information to be applied to each of the selection information registers 321 and information to be applied to each of the termination information registers 332.

Figure 8:
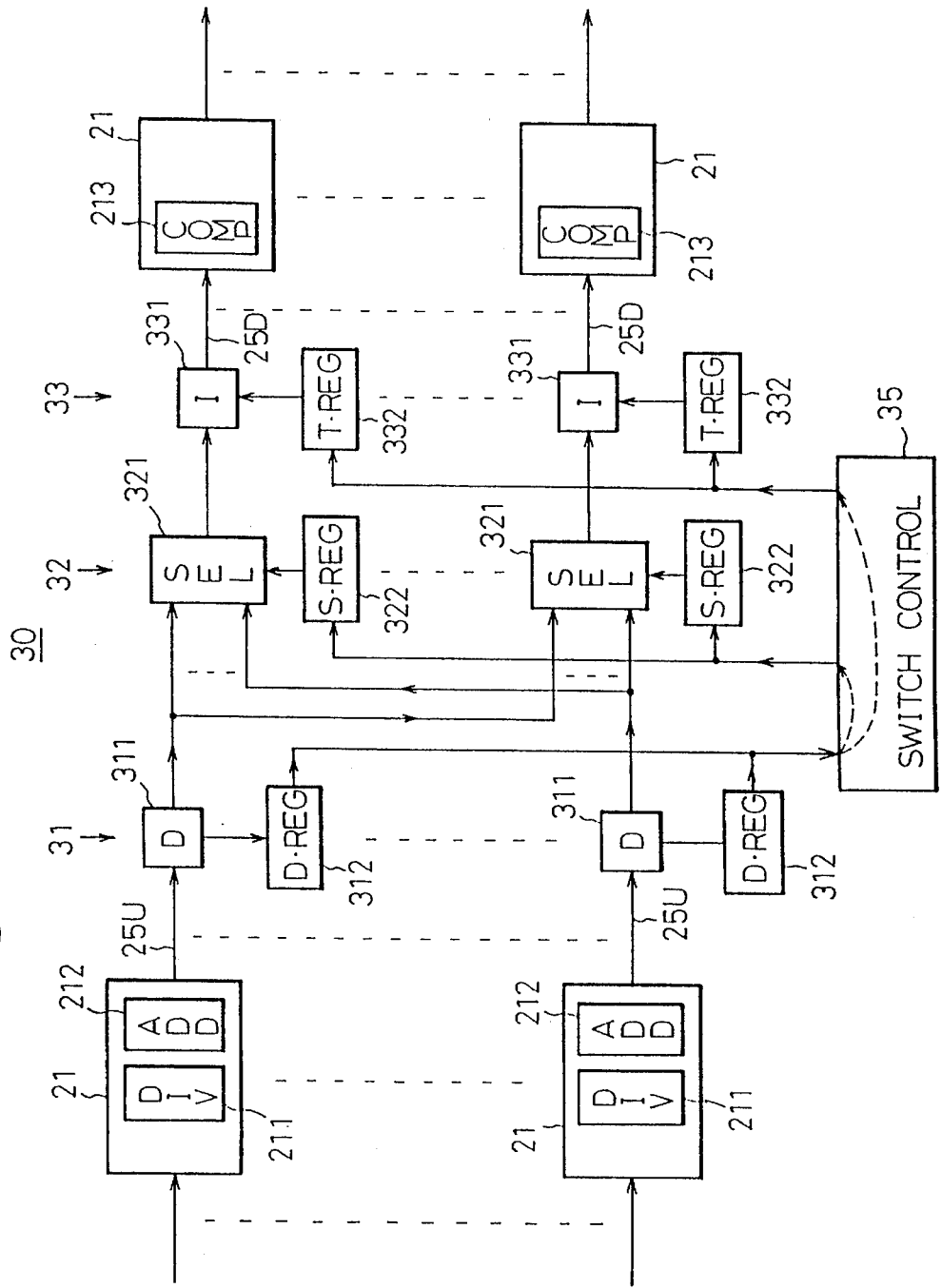
FIG. 8 illustrates a detailed example of the packet line control units 21 that operate in cooperation with the construction of FIG. 7.

FIG. 8 illustrates a detailed example of the packet line control units 21 to cooperate with the construction of FIG. 7. Each packet line control unit 21 is mounted with a means (DIV) 211 for dividing each originating packet data into packet frames (F) and a means (COMP) 213 for composing the received packet frames to reproduce the originated packet data.

Each packet line control unit 21 is mounted with a means (ADD) 212 for adding the transfer control information to each header area (H).

To be specific, the packet line control unit 21 decomposes the packet from the ISDN exchange 2 or the packet switching network 3. Through the decomposition, the packet data is obtained. The packet data is uniformly divided, at each timing cycle in the overall packet switching system 1, into data areas (DT) each having the same bit length. To each data area (DT) is further added the transfer control information (H) which specifies the destination packet call processing unit 22 or the destination packet line control unit 21 so that the packet frame (F) is obtained and then transferred, via the upstream highway 25U, to the packet switching equipment 30.

The packet call processing unit 22 also composes similar packet frames (F) based on the received packet data to be transferred to destination packet line control unit 21 via the corresponding downstream highway 25D.

In the packet switching equipment 30, the dropper 311 receives the packet frames (F) sequentially sent from the corresponding packet line control unit 21 via the corresponding upstream highway 25U and then detects the position where the transfer control information (H) is to be dropped in synchronism with the aforesaid timing uniformly defined in the packet switching system. The thus dropped information is momentarily stored in the corresponding register (D·REG) 312. The remaining data area (D) is further transferred to the selector (SEL) 321.

On the other hand, the switch control unit 35 analyzes the thus dropped transfer control information stored in the register 312 to discriminate the destination packet line control unit 21 or the packet call processing unit 22 and then obtains the discriminated selection information which is then sent to the register (S·REG) 322 disposed on the same route as the destination unit 21 or 22 is disposed. Thus, the selection information selects an input of the above selector, among a plurality of inputs, which is coupled to the related dropper 311. Simultaneously, the switch control 35 sends information ($G_A$) indicative of a success in connection to the register (T.·REG) 332 which is coupled, via the corresponding inserter (I) 331, to the aforesaid destination.

The aforesaid selector (SEL) 321 selects the data area (DT) from the dropper (D) 311 specified by the selection information and sends the same to the corresponding inserter (I) 331.

The inserter (I) 331 receives the data area (DT) from the above selector 321 and forms the packet frame (F) by combining this data area (DT) with the information ($G_A$) stored in the corresponding register 332. The packet frame is then transferred to the destination unit 21 or 22 via the downstream highway 25D.

When the switch control unit 35 analyzes a plurality of sets of transfer control information from a plurality of registers (D·REG) 312 and finds that at least two sets of the transfer control information specify the same destination unit (21, 22), only one piece of selection information is given to the register (S·REG) 322, which corresponds to one of the conflicting sets of the above transfer control information to which the highest priority is given. Namely, the switch control unit produces the selection information relying on a predetermined order of priority given to respective lines. In this case, the remaining registers (T·REG) 332 having lower priority are supplied with information ($G_N$) indicative of the unsuccessful connection.

The inserter (I) 331 corresponding to the originating unit (21, 22) inserts, at a predetermined position in the packet frame, termination information (G) from the switch control unit 35 and stored in the corresponding register (T·REG) 332 to reproduce the packet frame (F) with the transferred data area (DT) from the selector 321. The thus reproduced packet frame (F) is then transferred to the destination unit (21, 22) via the downstream highway 25D.

The destination unit (21, 22) receives the thus transferred packet frames serially and decomposes each packet frame into the data area (DT) and the termination information (G). The thus decomposed data area (DT) is composed to become an original packet by the means (COMP) 213, and the packet is then sent to the ISDN exchange 2 or the packet switching network 3. On the other hand, in the packet call processing unit 22, usual call processing is performed without composing the data area (DT) to become a packet.

In the originating unit (21, 22), the destination information G extracted from the packet frame (F) is analyzed. Based on the analysis, if the information ($G_A$) indicative of success in connection is detected, the operation proceeds to the next stage in which the following data area (DT) is transferred. To the contrary, if the information ($G_N$) indicative of unsuccessful connection is detected, the following data area (DT) which has not been transferred is retransmitted by the next packet frame.

In this regard, each unit (21, 22) should have a buffer memory (not shown in FIG. 8) for momentarily storing the data area to achieve the above mentioned retransmission.

If continuous data areas (DT) are to be transferred to the same destination unit (21, 22), the continuous transmission flag should be written in the header area (H) of the first packet frame to avoid a redundancy in writing the same transfer control information (destination address) to each packet frame. On the other hand, the selector 321 holds the same selection mode as the one specified by the transfer control information contained in the first packet frame if the transfer control information of the following packet frame or packet frames indicate the continuous transmission flag or continuous transmission flags.

Figure 9:
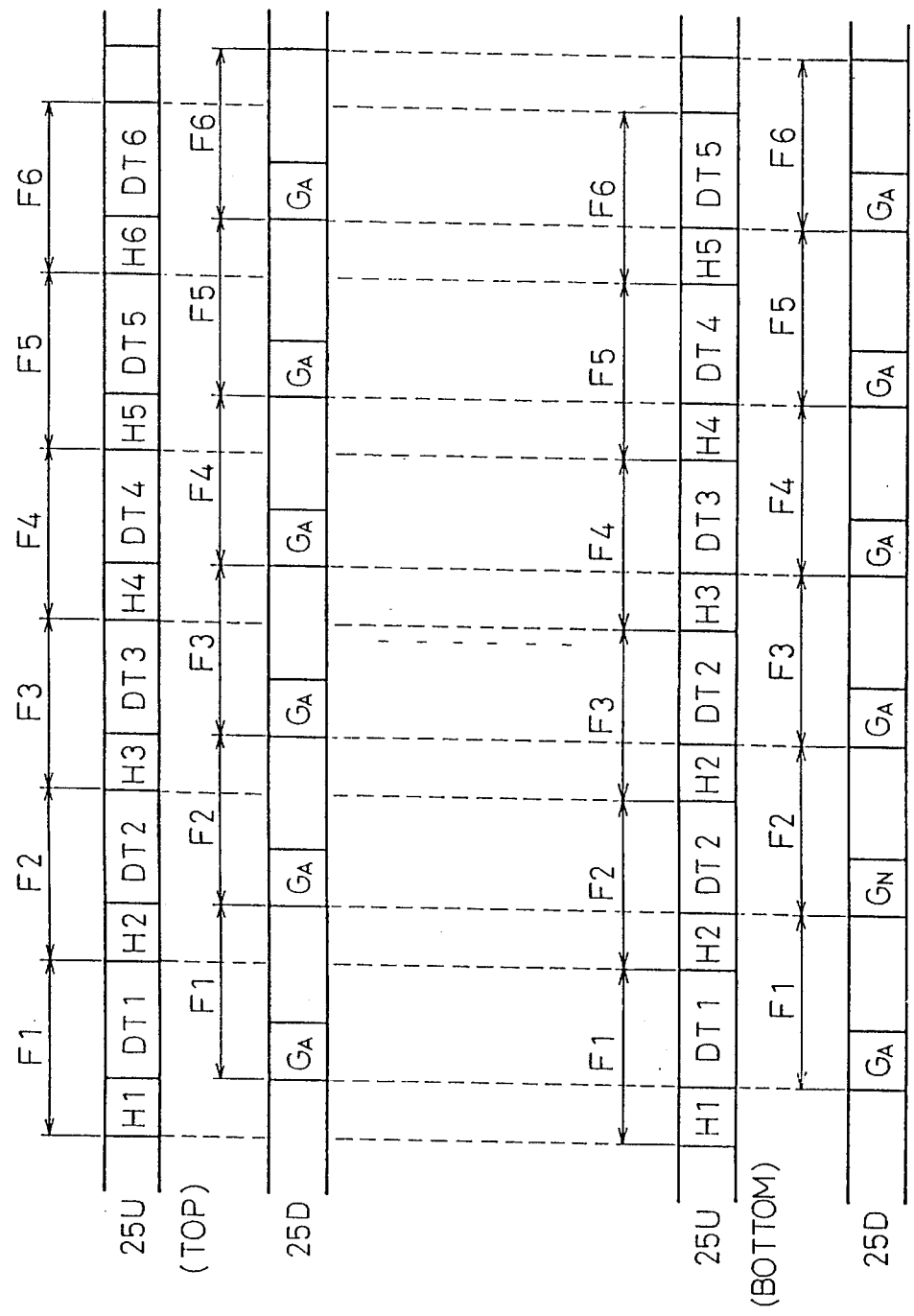
FIG. 9 depicts signal flows appearing on the upstream and downstream highways illustrated at the top and bottom of FIG. 7.

FIG. 9 depicts signal flows appearing on the upstream and downstream highways illustrated at the top and bottom of FIG. 7. In unit 21, the first packet frame F1 is composed by the first transfer control information (first header area H1) and the first packet data (first data area DT1). The first packet frame F1 is applied to the packet switching equipment 30 (FIG. 7), and, if the connection succeeds, the aforesaid information $G_A$ is returned. Then, the transfer of the following data areas DT2, DT3—is started to the same destination unit as specified by the header area H1. (Note that the header areas H2, H3—specify the same destination unit.) For the start of the transfer, the second header area H2 and the second data area (DT2) are first composed to be the second packet frame F2 and applied to the packet switching equipment 30. If the connection of the packet frame F2 by the equipment 30 is not successful, due to, e.g., traffic congestion, the aforesaid information $G_N$ is returned. Accordingly, the originating unit tries to send both the header area H2 and the data area DT2 again to the equipment 30 by using the next packet frame F3. Assuming here that the frame F3 succeeds in connection and the information $G_A$ is returned, both the header area H3 including the aforesaid continuous transmission flag and the data area DT3 compose the fourth packet frame F4 and the packet frame F4 is applied to the packet switching equipment 30. If the connection of the packet frame F4 succeeds in the equipment 30, the information $G_A$ is returned accordingly. Thereafter, the following header area H3 including the continuous transmission flag and the fourth data area DT4 compose the fifth packet frame F5 to enter into the packet switching equipment 30. If the connection of the packet frames F5 succeeds, the information $G_A$ is returned. Similar operation is repeated until all the data areas for one packet are transferred.

Thus, according the embodiment of the present invention, each packet data transmitted from the ISDN exchange 2 or the packet switching network 3 is divided into the data areas and the header areas are added to respective data areas to form the packet frames, and these operations are performed at uniform timing in the packet switching subsystem 1. This uniform timing will be clarified with reference to FIG. 9, that is, all the highways 25U and 25D transfer the packet frames in synchronism with each other.

The packet call processing unit 22 also creates similar packet frames (F) and applies the same to the packet switching equipment 30 sequentially. The equipment 30 drops the header area (H) from each packet frame from the units 21 and 22 to discriminate the destination unit to which the following data area is to be sent.

The above uniform and synchronous operation makes it possible to construct a system using simple hardware and this enables a realization of inexpensive packet switching equipment. Further, since the equipment operates autonomously, the load applied to the packet call processing unit is made lighter.

It should be understood that although the above explanation was given using the packet switching subsystem as an example, the present invention is applicable to other types of switching systems.

As explained above in detail, an economical packet switching system can be provided with simple hardware without reducing the packet switching capability compared to the conventional packet switching system.

We claim:

1. A packet data switching system comprising a plurality of transfer control units each sending and receiving packet data, and a packet switching equipment for exchanging each packet data output from one of said transfer control units to another of said transfer control units according to address information written in the corresponding packet wherein said packet data is contained, each of said transfer control units receiving each of said packet data to be exchanged and producing a plurality of packet frames by dividing the thus received packet data into portions, and each of said transfer control units adding transfer control information to each of said packet data portions in said packet frames, all of the transfer control units operating in communicating respective packet frames to and from said packet switching equipment, said packet switching equipment including:

dropper means for dropping said transfer control information from each of said packet frames from respective transfer control units;

selector means for receiving said packet frames from said dropper means, which temporarily retains said transfer control information, said selector means selecting one of the packet frames if a destination defined by the dropped transfer control information coincides with the related selector means;

inserter means for receiving said packet frames having no transfer control information from said selector means and inserting other transfer control information to be supplied to a destination transfer control unit; and switch control means for controlling said selector means and said inserter means by receiving the dropped transfer control information from said dropper means.

2. A system as set forth in claim 1, wherein all sets of said transfer control information in each of said packet frames are generated in said transfer control units and applied to said packet switching equipment synchronously at the same timing.

3. A system as set forth in claim 2, wherein all of the said packet frames are uniformly composed of both a header area and a data area, the header area being allotted to carry said transfer control information.

4. A system as set forth in claim 3, wherein said transfer control unit is operative to generate a continuous transmission flag as said transfer control information if a series of said packet frames are to be sent serially to the same destination transfer control unit.

5. A system as set forth in claim 4, wherein said selector means is operative to hold the same selection mode as one specified by the transfer control information contained in a preceding packet frame if the transfer control information of a following packet frame or packet frames is indicative of said continuous transmission flag or continuous transmission flags.

6. A system as set forth in claim 1, wherein said system is formed in a packet switching subsystem connected between a packet switching network and an ISDN exchange, said packet switching subsystem including said transfer control units which are comprised of packet line control units, and a packet call processing unit, and said packet line control units and packet call processing unit cooperating, via respective upstream highways and downstream highways, with said packet switching equipment for exchanging said packet data to be communicated between each two transfer control units.

7. A system as set forth in claim 6, wherein each of said dropper means is comprised of droppers through which said packet data pass sequentially, and dropped information registers which momentarily store therein each of said transfer control information to be dropped from the droppers, each of said selector means is comprised of selectors which receive the packet frames from said droppers which frames have no respective transfer control information, and selection information registers which are supplied with selection information for determining respective destination packet line control units according to the dropped transfer control information and specify the corresponding one of the input packet frames to be passed therethrough, each of said inserter means is comprised of inserters and termination information registers, each of the termination information registers being supplied with other transfer control information to be used by a destination packet line control unit, the information being derived from the corresponding dropped transfer control information, and the registered termination information is inserted, as the transfer control information, into the packet frames from the corresponding selector.

8. A system as set forth in claim 7, wherein said packet switching equipment further includes a switch control unit operative to receive each piece of transfer control information from said dropped information registers, and analyze the transfer control information to produce both the information to be applied to each of said selection information registers and information to be applied to each of said termination information registers.

9. A system as set forth in claim 6, wherein each of said packet line control units incorporates a means for dividing each of originating packet data into packet frames and a means for composing the received packet frames to reproduce the originating packet data.

10. A system as set forth in claim 9, wherein each of said packet line control units incorporates a means for adding the transfer control information to each of header areas of said packet frames.

11. A system as set forth in claim 8, wherein said switch control means produces said selection information relying on a predetermined order of priority given to respective lines.

12. A system as set forth in claim 4, wherein only a head packet frame in the series of said packet frames is indicative of the destination address information in its header area to discriminate the head of the packet frame series.

* * * * *